United States Patent Office 2,990,282

Patented June 27, 1961

2,990,282
METHOD OF ETCHING AND COMPOSITION THEREFOR

Warner C. Wicke, R.D. 3, Valleyview Ave., Schenectady, N.Y.

No Drawing. Original application Oct. 29, 1958, Ser. No. 770,570. Divided and this application Aug. 4, 1959, Ser. No. 838,375
1 Claim. (Cl. 96—36)

This invention relates to the etching of metals and more particularly to etching compositions and the manner of etching molybdenum plates to produce electronic grids and the like of irregular design. This application is a division of application Serial No. 770,570, filed October 29, 1958, for Acid Etching of Molybdenum.

In a conventional method of making electronic grids and the like, a photosensitive coating or film is applied to the surface of metals and the coated surface is exposed to light through a negative having an image thereon so as to produce a corresponding image on the coating. The exposed coated surface is "developed" forming an acid resistant coating in the form of the image produced by the exposure. The acid resistant coating or resist is usually further subjected to a hardening treatment which increases its resistance to the etching acid. The prepared metal surface or resist is then subjected to etching by suitable acid.

The etching is usually carried out with nitric acid suitably diluted with water and the acid solution may be splashed or otherwise impinged against the surfaces of object being etched. The acid solution attacks the bare portions of the metal, that is, the portions of the metal object denuded of the photosensitive material in the developing operation. The rest of the metal surface is protected by the coating or resist from direct attack by the acid and does not become etched while as the etching proceeds, metal from the base portions of the object which are not coated dissolve away leaving the metal covered by the image. Before a significant amount of the metal forming the image can be dissolved away by lateral attack, it is conventional practice to rinse off the etching solution, dry the rinsed object, and then treat the dried object so as to protect the metal image from lateral attack by the acid before proceeding with a further etching operation. Or, if desired, the base metal plate may also be coated with resist on the other side.

Molybdenum is a refractory metal and being softer and more ductile than other metals such as tungsten has found widespread use in filaments, grids, screens, and the like but heretofore has not been satisfactorily etched to produce such elements.

Accordingly, it is the broad object of this invention to provide a direct etching bath or composition, which is adapted particularly for etching.

A more specific object of this invention is directed to an electrolytic process for etching molybdenum to produce electronic grids.

In accordance with one aspect of the invention, an etching bath is prepared by mixing together nitric acid, sulphuric acid and distilled water and is used for the chemical etching of molybdenum plates.

This etching bath consists of a mixture of 33⅓ percent of concentrated sulphuric acid, and 33⅓ percent of concentrated nitric acid to which is added 33⅓ percent of distilled water, or the distilled water may be used as a diluent for the sulphuric acid so that a suitably dilute aqueous sulphuric acid solution is provided before the addition of the nitric acid. The mixture of these ingredients is agitated for several minutes to insure a uniform etching bath solution.

In order to form electronic grids by using the above prepared solution, an enlarged view of the design, which will ultimately be reproduced on the molybdenum plate, is drawn, for example, on paper, the portions which are desired to remain being made opaque by blackening. The entire design, including the blackened portions, is photographically reduced to required size and a negative of the design obtained. The molybdenum plate, which may be of the order of 0.001 inch thickness is then coated with a photosensitive glue or shellac which contains a substance providing an acid insolubilizing agent upon exposure to light such as a bichromate. The negative is then superimposed over the coated plate and exposed directly to light for a length of time sufficient for the design or pattern to be reproduced on the surface of the molybdenum plate. The portions of the shellac or glue which have been acted upon by the light will become insolubilized to acid, while the remaining portion will be soluble and can be removed by rubbing, brushing or sponging or dissolved away by alkali or otherwise removed from the plate leaving the molybdenum plate exposed. The molybdenum plate is then etched by applying the above prepared solution or mixture directly and according to conventional etching methods to form the desired electronic elements from the molybdenum plate. The remaining resist material is removed in an alkali solution and the etched plate allowed to dry.

An electrolytic etching bath or composition for producing molybdenum grids or other electronic elements is formulated by mixing together the following three ingredients in the stated proportions by volume:

The bath consists of 34 percent sulphuric acid reckoned as 100 percent $H_2SO_4$, 42 percent of orthophosphoric acid reckoned as 100 percent $2H_3PO_4.H_2O$ and 24 percent of distilled water. These ingredients are agitated together for several minutes to insure a uniform mixture or solution.

The molybdenum plate, prepared similarly as described heretofore, is immersed in the electrolytic etching bath solution and wires from the poles of a battery, or any suitable direct current source, are placed in the bath with the molybdenum plate attached to the positive wire and made anodic, while a suitable metal electrode, or cathode, is attached to the other wire to effect the etching of the molybdenum to form the electronic grids by removing the molybdenum from the anode and deposited on the cathode. Since the molybdenum plate is provided with a resist pattern on its surface which is unaffected by the bath solution, only molybdenum will be removed from the exposed surface of the anode and the remaining portion of the plate will form the electronic grid.

What is claimed is:

A method of producing electronic grids from a thin molybdenum plate which comprises the steps of coating said molybdenum plate with photosensitive resist material, applying a photographic negative of a desired grid design to the resist material, exposing the assembly to light to provide acid insoluble areas beneath the negative which outline the desired grid design and other acid soluble areas, removing the photosensitive resist from said other acid soluble areas by washing to provide the plate with bare surfaces, then subjecting the thus bared surfaces of the plate to the direct action of a chemical bath containing by volume one-third concentrated sulphuric acid, one-third concentrated nitric acid and the balance of distilled water.

References Cited in the file of this patent

Mertle: Chemical Abstracts, January 20, 1943, p. 320.

Rhodes et al.: Ind. Eng. Chem. February 1929, pp. 142–150.

Lange's Handbook of Chemistry, 8th ed., p. 988.

UNITED STATES PATENT OFFICE
CERTIFICATION OF CORRECTION

Patent No. 2,990,282 June 27, 1962

Warner C. Wicke

It is hereby certified that error appears in the above numbered patent requiring correction and that the said Letters Patent should read as corrected below.

In the grant, lines 1 to 3, for "Warner C. Wicke, of Schenectady, New York," read -- Warner C. Wicke, of Schenectady, New York, assignor, by mesne assignments, to United States of America as represented by the Secretary of the Navy, --; line 12, for "Warner C. Wicke, his heirs or assigns" read -- United States of America as represented by the Secretary of the Navy --; in the heading to the printed specification, lines 4 and 5, for "Warner C. Wicke, R.D. 3, Valleyview Ave., Schenectady, N. Y." read -- Warner C. Wicke, Schenectady, N. Y., assignor, by mesne assignments, to United States of America as represented by the Secretary of the Navy --.

Signed and sealed this 11th day of September 1962.

(SEAL)
Attest:

ERNEST W. SWIDER
Attesting Officer

DAVID L. LADD
Commissioner of Patents